United States Patent
Roylance et al.

(10) Patent No.: US 6,941,011 B2
(45) Date of Patent: Sep. 6, 2005

(54) METHOD AND SYSTEM FOR IMAGE PROCESSING INCLUDING MIXED RESOLUTION, MULTI-CHANNEL COLOR COMPRESSION, TRANSMISSION AND DECOMPRESSION

(75) Inventors: Eugene A. Roylance, Boise, ID (US); Randall E. Grohs, Star, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 615 days.

(21) Appl. No.: 10/185,992

(22) Filed: Jun. 27, 2002

(65) Prior Publication Data

US 2004/0001622 A1 Jan. 1, 2004

(51) Int. Cl.[7] ................................. G06K 9/34
(52) U.S. Cl. ...................... 382/164; 382/166; 382/243; 382/199; 375/240.25
(58) Field of Search ................. 382/162, 164, 382/165, 166, 167, 170, 173, 190, 199, 232, 233, 243, 240, 248, 250, 264; 348/14.13, 568, 439.1; 375/240.25; 358/426.01, 426.02, 426.03, 426.04

(56) References Cited

U.S. PATENT DOCUMENTS

| | | |
|---|---|---|
| 5,172,237 A | 12/1992 | Blonstein et al. |
| 5,268,967 A * | 12/1993 | Jang et al. .................. 382/132 |
| 5,398,066 A | 3/1995 | Martinez-Uriegas et al. |
| 5,541,653 A | 7/1996 | Peters et al. |
| 5,644,406 A | 7/1997 | Harrington et al. |
| 5,682,249 A | 10/1997 | Harrington et al. |
| 5,684,895 A | 11/1997 | Harrington |
| 5,930,386 A | 7/1999 | Saito |
| 6,058,211 A | 5/2000 | Bormans et al. |
| 6,130,630 A | 10/2000 | Grohs et al. |
| 6,236,427 B1 | 5/2001 | Roylance et al. |
| 6,731,800 B1 * | 5/2004 | Barthel et al. ............... 382/176 |
| 6,771,834 B1 * | 8/2004 | Martins et al. ............. 382/257 |
| 2003/0202697 A1 * | 10/2003 | Simard et al. ............... 382/195 |
| 2004/0218823 A1 * | 11/2004 | Kondo ........................ 382/239 |

* cited by examiner

*Primary Examiner*—Kanjibhai Patel
*Assistant Examiner*—Ali Bayat

(57) ABSTRACT

The present invention is a method and system for mixed resolution, multi-channel color image processing including compression, transmission and decompression. The color information is defined at a lower resolution since colors generally do not change at a high frequency and higher compression ratios may be obtained with the lower resolution. The edge information contains the commands switch between the foreground and background colors. The edge information occurs at high resolution and high frequency rates relative to the color information. The lower resolution color planes can be pixel replicated to the resolution of the edge information after compression and decompression for proper edge selection to occur. The resulting reconstructed image of foreground and background colors retains high detail.

21 Claims, 4 Drawing Sheets

METHOD AND SYSTEM FOR IMAGE PROCESSING INCLUDING MIXED RESOLUTION, MULTI-CHANNEL COLOR COMPRESSION, TRANSMISSION AND DECOMPRESSION

FIELD OF THE INVENTION

The present invention relates generally to image processing systems. More particularly, the present invention relates to a method and system for mixed resolution, multi-channel color image processing including compression, transmission and decompression.

BACKGROUND OF THE INVENTION

A digital image is typically printed or displayed in the form of a rectangular array of "picture elements," more commonly known as pixels. Digital images are typically represented in a computer by one or more arrays of binary numbers. For example, a monochrome digital image may be represented in a computer by a single array of binary numbers associated with the pixels. Each binary number in the array defines a gray-level value for an associated pixel. The position of the binary number in the array describes the spatial location of the pixel.

A color digital image may be represented in a computer by a plurality (typically three) of arrays of binary numbers. The terms "array" and "color plane" may be used synonymously herein. Each array may represent an axis of a suitable color coordinate system in accordance with trichromatic theory as known to one of ordinary skill in the art. The color of a pixel in a digital image may be defined by an associated binary number from each array. There are a number of color coordinate systems known to one of ordinary skill in the art, for example, red-green-blue (RGB) color coordinate system, cyan-magenta-yellow (CMY) color coordinate system and luminescence (Y), red-yellow (Cr) and blue-yellow (Cb) color coordinate systems.

Large amounts of data are required to represent large, uncompressed color images. Large amounts of data require significant amounts of memory storage in a computer system. While the cost of memory in computer systems has traditionally decreased over time, there are always significant costs associated with memory for computer systems. Additionally, the more data required for a color image, the more difficult it is to transmit the data from place to place in the computer system in a timely manner, thus, requiring faster processors and memory systems. For these reasons, digital image compression techniques have been developed to reduce the costs associated with storing digital color images.

Generally, image compression techniques can be divided into two classes: lossless encoding and lossy encoding. Lossless image compression refers to image encoding and decoding techniques that result in a reconstructed digital image that is identical, pixel for pixel, to the original digital image. Lossy image compression results in a reconstructed digital image that is degraded relative to the original digital image, but may allow for higher compression ratios than those of lossless techniques. One popular type of lossy image compression may be referred to as "transform coding." Among the most well-known transform coding schemes are those that have been standardized by the Joint Photographic Experts Group (JPEG). JPEG images are widely found in use today on Internet web pages. The term "codec" is an acronym for compressor/decompressor. A codec is any technology for compressing and decompressing data. Codecs may be implemented in software, hardware, or a combination of both. JPEG is a codec.

A conventional multi-channel color compression image processor may include three planes of data. The first plane includes foreground colors, which is usually encoded with a lossless image compression technique to maintain detail. The second plane includes background colors and typically has less detail and is suitable for lossy image compression techniques. The third plane is a binary plane that serves as a switch command between the foreground and background color planes. Multi-channel color compression was developed to produce higher compression ratios by separating information by level of detail, i.e., foreground and background planes. However, in conventional multi-channel color compression, all three planes are maintained at the highest resolution desired, i.e., equal to the targeted marking device. The high resolution may limit compression capability.

Thus, there exists a need in the art for a multi-channel color compression image processing technique that maintains high resolution for edge information but allows reduced resolution for both foreground and background color planes prior to compression and resolution synthesizing after decompression.

SUMMARY OF THE INVENTION

A method of multi-channel color image compression is disclosed. The method may include analyzing a color image to determine foreground colors, background colors and edge information and selectively and independently reducing resolutions of the foreground colors and the background colors to obtain reduced resolution foreground colors and background colors. The method may further include selectively reducing resolution of the edge information to a higher resolution than that of the reduced resolution foreground colors and background colors to obtain reduced resolution edge information and selectively and independently compressing the reduced resolution foreground colors, background colors and edge information.

A method of multi-channel colors image decompression is disclosed. The method may include separating a compressed colors image into foreground colors, background colors and edge information and decompressing the foreground colors, background colors and edge information to obtain decompressed foreground colors, background colors and edge information. The method may further include resolution synthesizing the decompressed foreground colors and background colors to obtain resolution synthesized foreground colors and background colors and multiplexing the resolution synthesized foreground colors and background colors in accordance with the decompressed edge information to obtain a reconstructed color image.

A method of transmitting an original color image using multi-channel color image processing is disclosed. The method may include separating the original color image into background colors, foreground colors and edge information and reducing resolution for the background colors and foreground colors to obtain reduced resolution background colors and foreground colors, the edge information having higher resolution than the reduced resolution background colors and foreground colors. The method may further include selectively and independently compressing the reduced resolution background colors and foreground colors and the edge information to obtain compressed background colors, foreground colors and edge information, packaging the compressed background colors, foreground colors and edge information to obtain an encoded color image and transmitting the encoded color image.

The method may further include receiving the encoded color image, unpacking the encoded color image to obtain compressed foreground colors, background colors and edge information and decompressing the compressed foreground colors, background colors and edge information to obtain decompressed foreground colors, background colors and edge information. The method may further include resolution synthesizing the decompressed foreground colors and background colors to a resolution level equal to the decompressed edge information to obtain resolution synthesized foreground colors and background colors and multiplexing the resolution synthesized foreground colors and background colors in accordance with the decompressed edge information to obtain a reconstructed color image.

A multi-channel color image processing system is disclosed. The system may include an input device, a processor in communication with the input device, an imaging device in communication with the processor device for generating a reconstructed image and a memory device in communication with the processor and configured for storing computer instructions implementing a method of multi-channel color image processing for execution by the processor.

These embodiments of the present invention will be readily understood by reading the following detailed description in conjunction with the accompanying figures of the drawings.

DESCRIPTION OF THE DRAWINGS

The drawings illustrate what is currently regarded as a best mode for carrying out the invention. In the drawings, like reference numerals refer to like parts in different views or embodiments.

DETAILED DESCRIPTION OF THE INVENTION

The invention includes a method and system for mixed resolution, multi-channel color image compression, transmission and decompression. For convenience only, a laser printer will be used as the exemplary imaging apparatus described herein. However, one of skill in the art will recognize that the inventive methods, apparatuses and systems described herein are also applicable to copy machines and facsimile machines as well as laser printers. The term "codec" is short for "coder/decoder", or "compressor/decompressor." A codec may be any technology for compressing and decompressing data or, alternatively, a device that encodes or decodes a signal. A codec may be implemented in software, hardware, or a combination of both.

Figure 1:
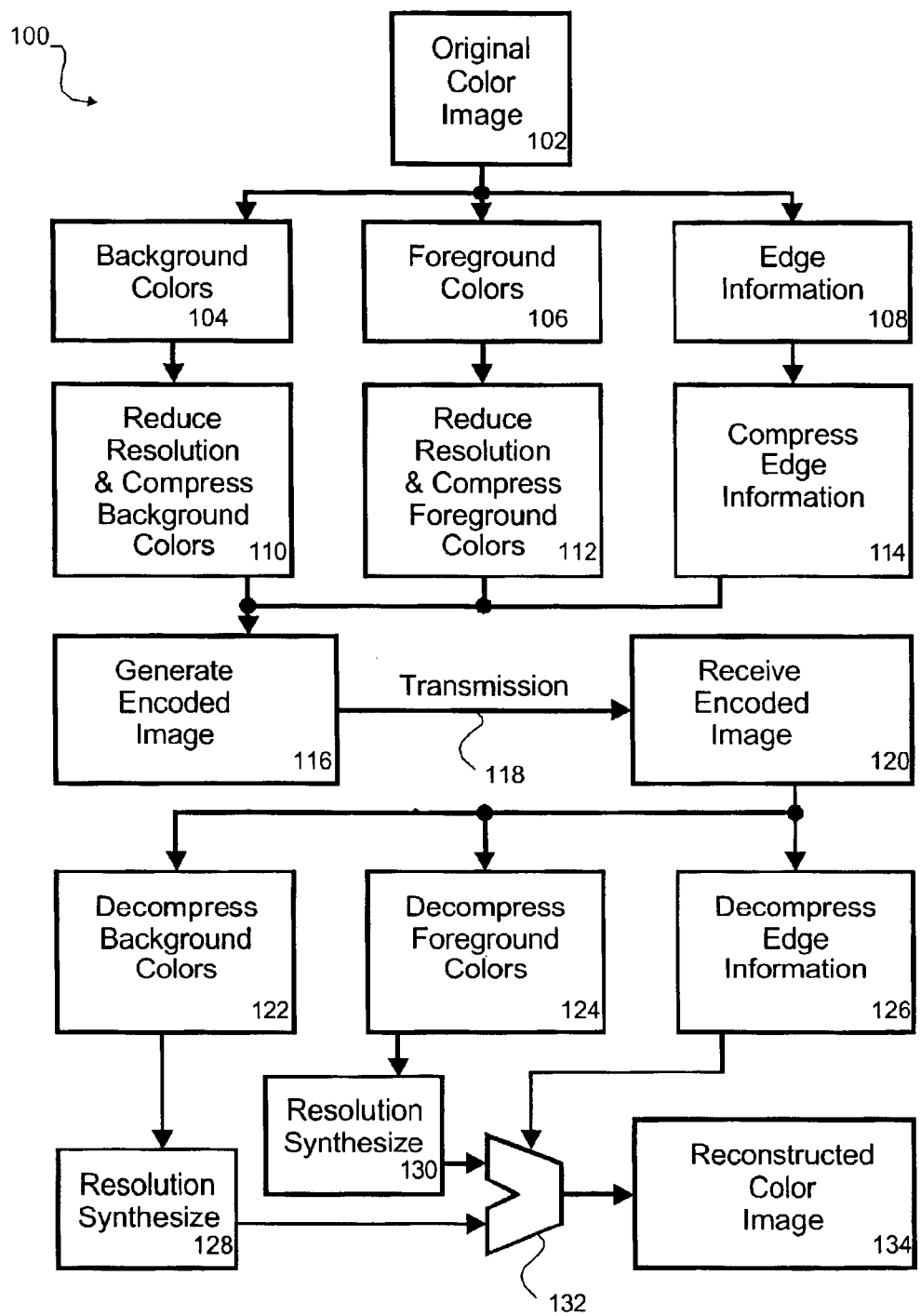
FIG. 1 is a flow diagram of a codec for mixed resolution, multi-channel color image processing in accordance with the present invention.

FIG. 1 is a flow diagram of a codec 100 for mixed resolution, multi-channel color image processing in accordance with the present invention. Codec 100 starts with an original color image 102, which is separated into background colors 104, foreground colors 106 and edge information 108. The term "background colors" may be referred to herein as the "background color plane." Similarly, the term "foreground colors" is synonymous with "foreground color plane." Likewise, the term "edge information" may be referred to herein as the "binary plane."

Codec 100 further includes selectively and independently reducing resolution and compressing background colors 110. Prior art multi-channel color compression requires all three planes (foreground colors, background colors and edge information) to be maintained at the highest resolution of the system prior to compression. The higher resolution maintained by the prior art approach may limit the compression ratios that may be obtained through the present invention. The resolution of the background color plane may be selectively reduced to any level of resolution suitable because the colors generally do not change at a high frequency. Similarly, codec 100 further includes selectively and independently reducing resolution and compressing foreground colors 112. Like the background colors, the foreground colors may be selectively reduced to any level of resolution suitable because colors generally do not change at a high frequency. Thus, according to the codec 100 of the present invention, the color planes may be reduced to a lower resolution, for example, integer multiples of the level of resolution of the binary plane (edge information). In accordance with the present invention, resolution may be reduced on the background and foreground colors 110, 112 as much as possible while maintaining an acceptable image quality.

Additionally, the color planes (background and foreground) may be compressed using lossy or lossless compression techniques. The compression techniques selected for each of the color planes may be optimized for that color plane. It is not necessary that both color planes use the same compression technique according to the present invention. By using lossy compression techniques, higher compression ratios may be obtained according to the present invention. Various methods of compression, both lossy and lossless, and their selective application to color planes are known to one of ordinary skill in the art and, thus, will not be further elaborated herein. Similarly, methods of reducing resolution are also known to one of ordinary skill in the art and, thus, will not be further elaborated herein.

Codec 100 also compresses edge information 114 to obtain an encoded image 116. According to codec 100, edge information may also be reduced in resolution prior to binary compression. However, it is preferable that the binary plane be maintained at the highest resolution because the binary plane contains the information of the edges of an image that tends to change at high frequency. Thus, in accordance with the present invention, the resolution level of the binary plane (edge information) must be maintained at a higher level than that of either of the color planes (background and foreground colors) prior to compression.

Once the background colors, foreground colors and edge information have been compressed, each plane is packaged to generate an encoded image 116. The encoded image may be transmitted 118 to a receiver 120. Transmission 118 may take any form known to one of ordinary skill in the art, for example and not by way of limitation, by packetizing the encoded image and transmitting it over a packet-based network or storing the encoded image on a removable storage medium and physically transporting the storage medium to the receiver. Because the encoded image of the present invention may have higher compression ratios than those of the prior art, the transmission 118 may take less time and storage capacity at the transmitter and the receiver. Once an encoded image has been received 120, it is unpacked into decompressed background colors 122, decompressed foreground colors 124 and decompressed edge information 126.

Once the color planes have been decompressed, they are each resolution synthesized 128, 130 to the resolution of the decompressed binary plane. The decompressed binary plane is used to select (switch) between the foreground and background colors. For example, when a particular pixel of the reconstructed image is foreground color, the binary plane may indicate a "1". Conversely, if the particular pixel of the reconstructed image 134 is background color, the binary plane may indicate "0". Thus, a multiplexer 132 (MUX) is used to select between foreground or background colors based on the binary (switch) plane. Resolution synthesis 128, 130 may be performed using various procedures. Perhaps the simplest form of resolution synthesis 128, 130 is pixel replication. However, other forms of resolution synthesis 128, 130 are also suitable for use with the present invention including interpolation, template-based scaling, neural-network based synthesis and any other suitable form of resolution synthesis as known to one of skill in the art.

Figure 2A:
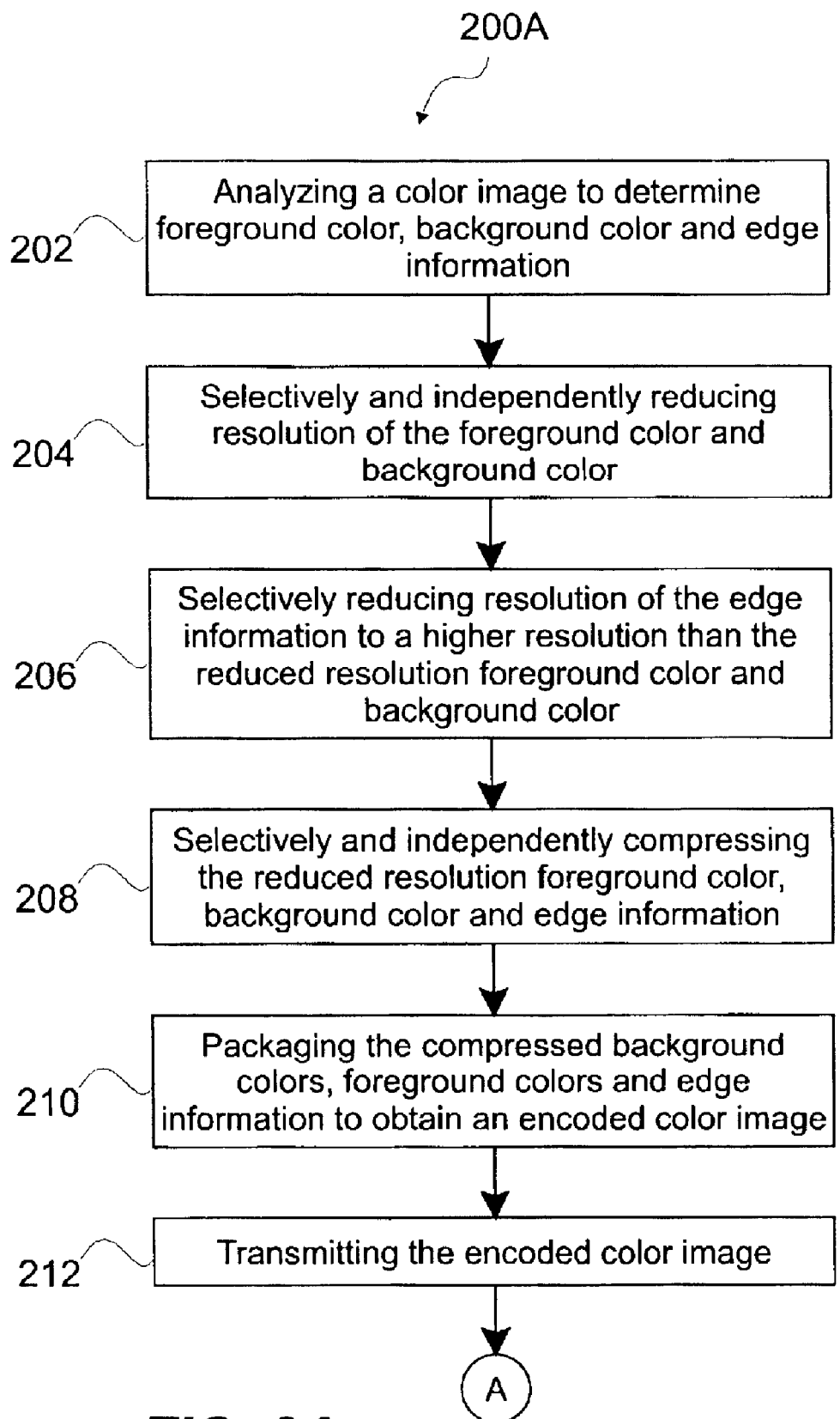
FIG. 2A is a flow diagram of a method of encoding an image using multi-channel color image compression in accordance with the present invention.

Referring to FIG. 2A, a flow diagram of a method 200A of encoding an image using multi-channel color image compression in accordance with the present invention is shown. Method 200A may include analyzing 202 a color image for content, which is divided into foreground colors, background colors and edge information, Method 200A may further include selectively and independently reducing resolution 204 of the foreground colors and the background color. Method 200A may further include selectively reducing resolution of the edge information 206, but maintaining a level of resolution higher than the reduced resolution foreground colors and reduced resolution background color. Preferably, the resolution level of the edge information remains at or near the highest resolution level available. Each color plane (background and foreground) is defined at the lowest resolution level possible. However, the edge information is maintained at a higher resolution level than the color planes.

Method 200A may further include selectively and independently compressing 208 the reduced resolution foreground colors, background colors and edge information and then packaging 210 the compressed background colors, foreground colors and edge information to obtain an encoded color image. Compression 208 may be lossy or lossless. However, lossy compression may result in higher compression ratios. Method 200A may further include transmitting 212 the encoded color image. Transmission 212 may be, for example and not by way of limitation, over a packet-based network or physically through a removable storage medium.

Figure 2B:
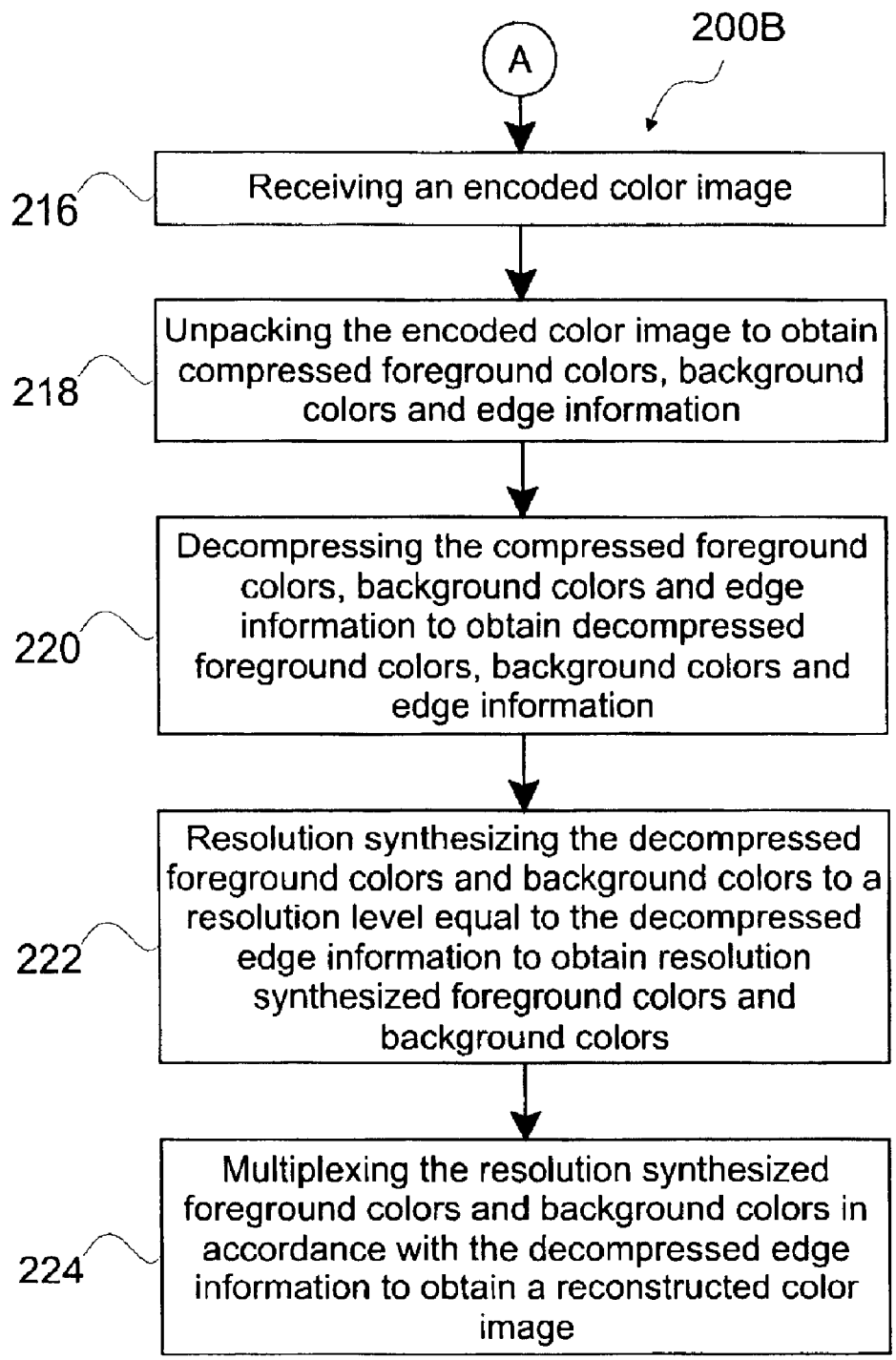
FIG. 2B is a flow diagram of a method of decoding an image compressed using multi-channel color image compression in accordance with the present invention.

Referring to FIG. 2B, a flow diagram of a method 200B of decoding an image compressed using multi-channel color image compression in accordance with the present invention is shown. Method 200B may include receiving 216 an encoded color image and unpacking 218 the encoded color image to obtain compressed foreground colors, background colors and edge information. Method 200B may further include decompressing 220 the compressed foreground colors, background colors and edge information to obtain decompressed foreground colors, background colors and edge information. Right before recombination, the color planes are resolution synthesized 222 (pixel replicated) to the resolution of the decompressed edge information (binary or switch plane). Method 200B may further include multiplexing 224 the resolution synthesized foreground colors and background colors in accordance with the decompressed edge information to obtain a reconstructed color image. The multiplexed output (reconstructed color image 134) is then ready to be displayed or printed.

Methods 200A and 200B, as shown in FIGS. 2A and 2B, may be combined to define a procedure for multi-channel color image compression, transmission and decompression in accordance with the present invention. Either method 200A or 200B, individually, the combination of both methods 200A and 200B, or any subset of either method 200A or 200B may be implemented in computer instructions for execution by a processor 302 (see FIG. 3). Such computer instructions may take the form of a computer program having one or more subroutines, modules or objects as known to one of ordinary skill in the art. Such a computer program may be stored on a data storage medium/device 308 (See, FIG. 3), for example and not by way of limitation, a floppy disk, compact disc—read only memory (CD-ROM), digital versatile disc (DVD), hard disk, read only memory (ROM), dynamic random access memory (DRAM), or any other suitable data storage medium or device. Processor 302 may be a general purpose microprocessor, a special purpose processor, an application specific integrated circuit (ASIC) or any other processor configured to execute instructions either in software or hardware-based logic such as a state machine. In the case where processor 302 is an ASIC, the term "computer instructions", as referred to above, may imply permanently implemented and specific state machine operations. The selection and implementation of a processor 302 for use in accordance with the present invention is within the knowledge of a person of ordinary skill in the art and, thus, will not be further elaborated herein.

Figure 3:
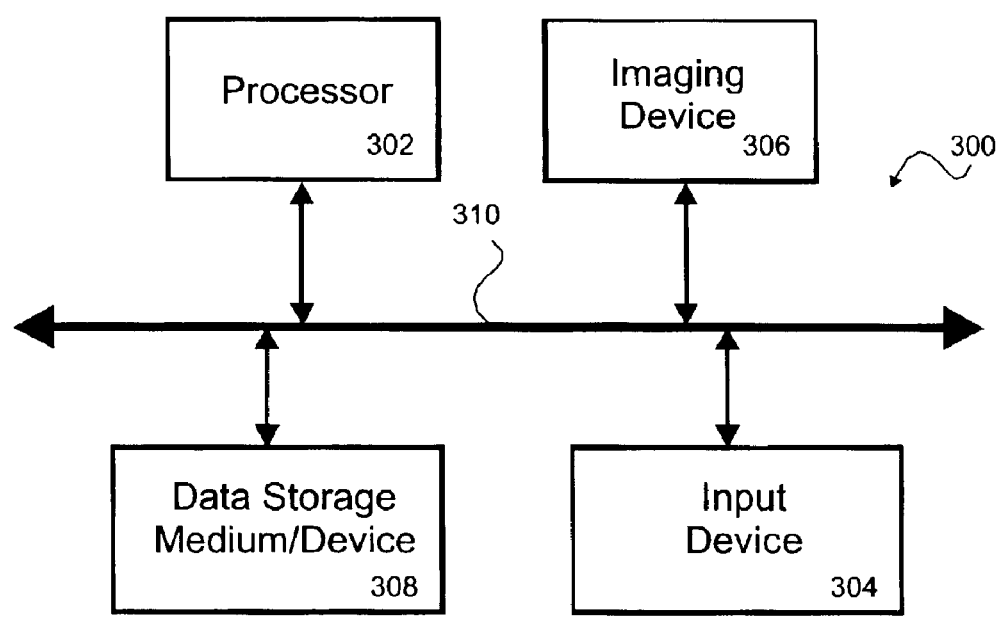
FIG. 3 is a block diagram of a system configured for multi-channel color image compression in accordance with the present invention.

FIG. 3 is a block diagram of a system 300 configured for multi-channel color image compression in accordance with the present invention. System 300 may include a processor 302 in communication 310 with an input device 304, in communication 310 with an imaging device 306 and in communication with a data storage medium/device 308. As noted above, data storage medium/device 308 may be any suitable data storage medium or device capable of storing computer instructions or computer programs. Method 200A or method 200B or both may be stored on data storage medium/device 308. System 300 may be, for example and not by way of limitation, a printer, a computer or a network.

Advantages of the present invention include separating the color information from edge information in a color image. The color information is defined at a lower resolution since colors generally do not change at a high frequency and higher compression ratios may be obtained with the lower resolution. The edge information contains the commands switch between the foreground and background colors. The edge information preferably occurs at high resolution and high frequency rates relative to color information. The lower resolution color planes can be pixel replicated to the resolution of the edge information after compression for proper edge selection to occur. The resulting reconstruction image of foreground and background colors retains high detail.

Although this invention has been described with reference to particular embodiment, the invention is not limited to these described embodiments. Rather, the invention is limited only by the appended claims, which include within their scope all equivalent devices or methods that operate according to the principles of the invention as described herein.

What is claimed is:

1. A method of multi-channel color image compression comprising:

analyzing a color image to determine foreground colors, background colors and edge information;

selectively and independently reducing resolutions of said foreground colors and said background colors to obtain reduced resolution foreground colors and background colors;

selectively reducing resolution of said edge information to a higher resolution than that of said reduced resolution foreground colors and background colors to obtain reduced resolution edge information; and selectively and independently compressing said reduced resolution foreground colors, background colors and edge information.

2. The method of claim 1, wherein said selectively and independently compressing said reduced resolution foreground colors, background colors and edge information comprises selecting a compression technique individually optimized for each of said reduced resolution foreground colors, background colors and edge information.

3. The method of claim 1, wherein said reduced resolution foreground colors comprise a different resolution level than that of said reduced resolution background colors.

4. The method of claim 1, wherein a resolution level of said edge information comprises an integer multiple of a resolution level of either of said foreground colors or said background colors.

5. The method of claim 1, wherein said selectively and independently compressing said reduced resolution foreground colors comprises lossy compression.

6. The method of claim 1, wherein said selectively and independently compressing said reduced resolution background colors comprises lossy compression.

7. A method of multi-channel colors image decompression comprising:

separating a compressed colors image into foreground colors, background colors and edge information;

decompressing said foreground colors, background colors and edge information to obtain decompressed foreground colors, background colors and edge information;

resolution synthesizing said decompressed foreground colors and background colors to obtain resolution synthesized foreground colors and background colors; and multiplexing said resolution synthesized foreground colors and background colors in accordance with said decompressed edge information to obtain a reconstructed color image.

8. A method of transmitting an original color image using multi-channel color image processing comprising:

separating said original color image into background colors, foreground colors and edge information;

reducing resolution of said background colors and foreground colors to obtain reduced resolution background colors and foreground colors, said edge information having higher resolution than said reduced resolution background colors and foreground colors;

selectively and independently compressing said reduced resolution background colors and foreground colors and said edge information to obtain compressed background colors, foreground colors and edge information;

packaging said compressed background colors, foreground colors and edge information to obtain an encoded color image; and transmitting said encoded color image.

9. The method of claim 8, wherein said selectively and independently compressing said reduced resolution foreground colors comprises lossy compression.

10. The method of claim 8, wherein said selectively and independently compressing said reduced resolution background colors comprises lossy compression.

11. The method of claim 8, wherein said selectively and independently compressing said edge information comprises lossless compression.

12. The method of claim 8, further comprising:

receiving said encoded color image;

unpacking said encoded color image to obtain compressed foreground colors, background colors and edge information;

decompressing said compressed foreground colors, background colors and edge information to obtain decompressed foreground colors, background colors and edge information;

resolution synthesizing said decompressed foreground colors and background colors to a resolution level equal to that of said decompressed edge information to obtain resolution synthesized foreground colors and background colors; and multiplexing said resolution synthesized foreground colors and background colors in accordance with said decompressed edge information to obtain a reconstructed color image.

13. A multi-channel color image processing system, comprising:

an input device;

a processor in communication with said input device;

an imaging device in communication with said processor for generating a reconstructed image; and a memory device in communication with said processor and configured for storing computer instructions implementing a method of multi-channel color image processing for execution by said processor, said method comprising:

receiving an original color image;

separating said original color image into background colors, foreground colors and edge information;

reducing resolution of said background colors and foreground colors to obtain reduced resolution background colors and foreground colors, said edge information having higher resolution than said reduced resolution background colors and foreground colors;

selectively and independently compressing said reduced resolution background colors and foreground colors and said edge information to obtain compressed background colors, foreground colors and edge information;

packaging said compressed background colors, foreground colors and edge information to obtain an encoded color image; and transmitting said encoded color image.

14. The multi-channel color image processing system of claim 13, wherein said method further comprises:

receiving said encoded color image;

unpacking said encoded color image to obtain compressed foreground colors, background colors and edge information;

decompressing said compressed foreground colors, background colors and edge information to obtain decompressed foreground colors, background colors and edge information;

resolution synthesizing said decompressed foreground colors and background colors to a resolution level equal to that of said decompressed edge information to obtain resolution synthesized foreground colors and background colors; and multiplexing said resolution synthesized foreground colors and background colors in accordance with said decompressed edge information to obtain a reconstructed color image.

15. A data storage medium containing computer instructions implementing a procedure for multi-channel color image processing, said procedure comprising:

analyzing a color image to determine foreground colors, background colors and edge information;

selectively and independently reducing resolutions of said foreground colors and said background colors to obtain reduced resolution foreground colors and background colors;

selectively reducing resolution of said edge information to a higher resolution than that of said reduced resolution foreground colors and background colors to obtain reduced resolution edge information; and selectively and independently compressing said reduced resolution foreground colors, background colors and edge information.

16. The data storage medium of claim 15, wherein said procedure further comprises:

separating a compressed colors image into foreground colors, background colors and edge information;

decompressing said foreground colors, background colors and edge information to obtain decompressed foreground colors, background colors and edge information;

resolution synthesizing said decompressed foreground colors and background colors to obtain resolution synthesized foreground colors and background colors; and multiplexing said resolution synthesized foreground colors and background colors in accordance with said decompressed edge information to obtain a reconstructed color image.

17. A codec for multi-channel color image processing, wherein said codec includes:

analyzing a color image to determine foreground colors, background colors and edge information;

selectively and independently reducing resolutions of said foreground colors and said background colors to obtain reduced resolution foreground colors and background colors;

selectively reducing resolution of said edge information to a higher resolution than that of said reduced resolution foreground colors and background colors to obtain reduced resolution edge information; and selectively and independently compressing said reduced resolution foreground colors, background colors and edge information.

18. The codec of claim 17, wherein said selectively and independently compressing said reduced resolution foreground colors comprises lossy compression.

19. The codec of claim 17, wherein said selectively and independently compressing said reduced resolution background colors comprises lossy compression.

20. The method of claim 17, wherein said selectively and independently compressing said reduced resolution edge information comprises lossless compression.

21. The codec of claim 17, further comprising:

separating a compressed colors image into foreground colors, background colors and edge information decomposing said foreground colors and edge information to obtain decompressed foreground colors, background colors and edge information;

resolution synthesizing said decompressed foreground colors and background colors to obtain resolution synthesized foreground colors and background colors; and multiplexing said resolution synthesized foreground colors and background colors in accordance with said decompressed edge information to obtain a reconstructed color image.

* * * * *